April 12, 1966     S. KAGAN     3,245,332

SHUTTER TIMING APPARATUS

Filed May 31, 1963     2 Sheets-Sheet 1

INVENTOR.
Sholly Kagan
BY Brown and Mikulka
and
Ronald M. Sandler
ATTORNEYS

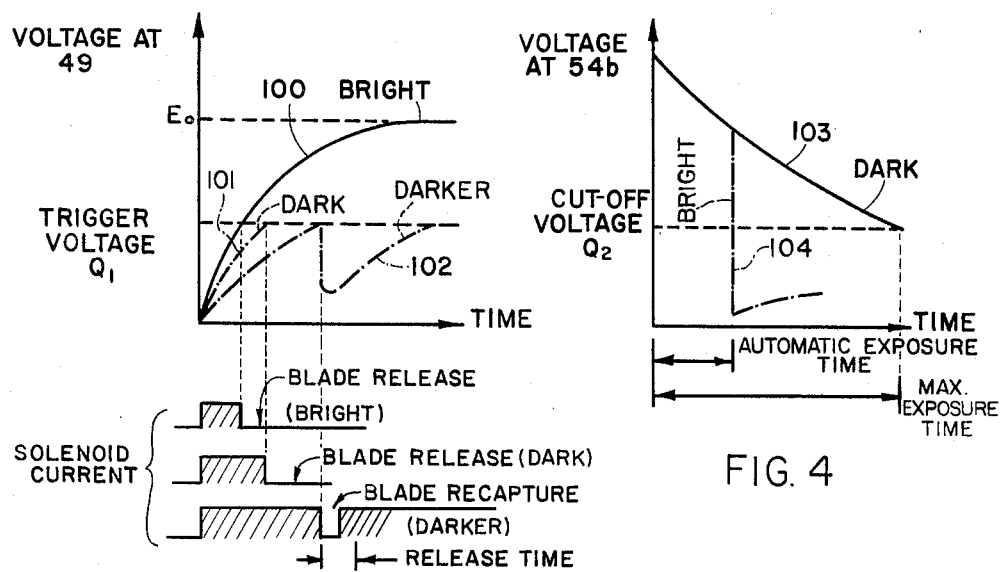
FIG. 3
FIG. 4
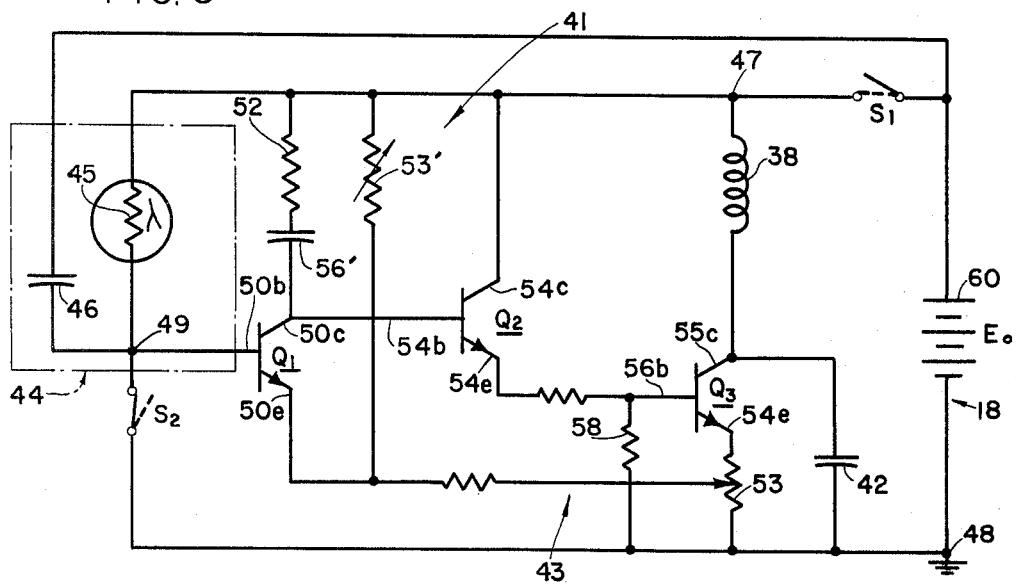
FIG. 5

United States Patent Office 3,245,332
Patented Apr. 12, 1966

3,245,332
SHUTTER TIMING APPARATUS
Sholly Kagan, Natick, Mass., assignor to Polaroid Corporation, Cambridge, Mass., a corporation of Delaware
Filed May 31, 1963, Ser. No. 284,729
22 Claims. (Cl. 95—53)

This invention relates to a shutter mechanism for a camera, and more particularly to a shutter mechanism of the type that is responsive to light from a scene being photographed for causing the exposure time to be functionally related to the level of scene brightness.

As used in this disclosure, the term "shutter mechanism" is intended to be applicable to the portion of a camera that includes the shutter and the means by which the latter is operated to effect exposure. The shutter of one recently developed shutter mechanism of the type described comprises an aperture opening blade and an aperture closing blade, each movable on the camera housing between a blocking terminal position and an unblocking terminal position relative to the exposure aperture for controlling the passage of incident light therethrough. Prior to exposure, the opening blade is releasably held in blocking position against the action of a spring urging the blade to its unblocking position; and serves to hold the closing blade in unblocking position against the action of a spring urging the latter blade to its blocking position.

The means by which the above-described shutter is operated comprises a keeper mounted on the closing blade and a solenoid operably associated with a pole piece, the latter being so mounted on the camera housing that the keeper engages the pole piece and completes therewith a magnetic circuit when the closing blade is in unblocking position whereby energization of the solenoid creates a magnetic force on the keeper sufficient to maintain the closing blade in its unblocking position against the action of the spring acting thereon. An electrical circuit is also provided and may include a timing circuit and a voltage sensitive trigger circuit. The timing circuit, when activated, generates a time variable voltage that reaches a level termed the trigger voltage in a period of time dependent on the resistance of a photoconductive element exposed to light from the scene being photographed. The voltage sensitive trigger circuit energizes the solenoid substantially at the same time the opening blade is released and the timing circuit is activated so that the solenoid is effective to maintain the closing blade in unblocking position as the opening blade moves towards its unblocking position to initiate exposure. In addition, the trigger circuit is responsive to the voltage generated by the timing circuit for deenergizing the solenoid when the trigger voltage is reached. After this occurs, the closing blade will be released and move toward blocking position to terminate exposure. If the time for the two blades to move between their respective terminal positions is the same, the exposure time is essentially equal to the time that the solenoid is energized even though the two times are not concurrent.

One of the problems associated with the shutter mechanism above described is concerned with malfunctions characterized by failure of the solenoid to release the keeper when the trigger voltage is reached. Such malfunctions occur at relatively low levels of scene brightness with the result that the closing blade "hangs" open for a considerable period subsequent to when the timing circuit has determined exposure should end. The difficulty is apparently due to an inability of the trigger circuit to deenergize the solenoid sufficiently to effect blade release.

It is therefore the primary object of the present invention to provide a shutter mechanism of the type described which prevents closing blade "hang-up," the term used to describe a malfunction in which the closing blade fails to be released in response to the generation of the trigger voltage by the timing circuit.

Briefly, the invention involves a recognition that there is a threshold level of scene brightness below which the closing blade is not released when the timing circuit generates the trigger voltage, but that at levels above such threshold, the timing circuit is effective to exert control over exposure. Therefore, the maximum exposure time which can be achieved automatically is known, and an auxiliary circuit is provided to insure deenergization of the solenoid, the latter circuit operating in a manner that is independent of the operation of the timing circuit. In this way, the timing circuit is effective to relate, functionally, the exposure to the level of scene brightness over a range of levels at which the timing circuit exerts control over the release of the closing blade. However, at any brightness level below this range, the auxiliary circuit is effective to control the release of the closing blade thereby precluding the possibility that the closing blade will hang-up in its unblocking position.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIG. 3 is a graph showing the variation with time of the voltage generated by the timing circuit shown in FIG. 2, including the manner in which solenoid current varies under several levels of scene brightness;

FIG. 4 is a graph showing the variations with time of the voltage applied to a portion of the trigger circuit for two different levels of scene brightness; and FIG. 5 is a schematic electrical diagram showing another embodiment of the invention.

Figure 1:
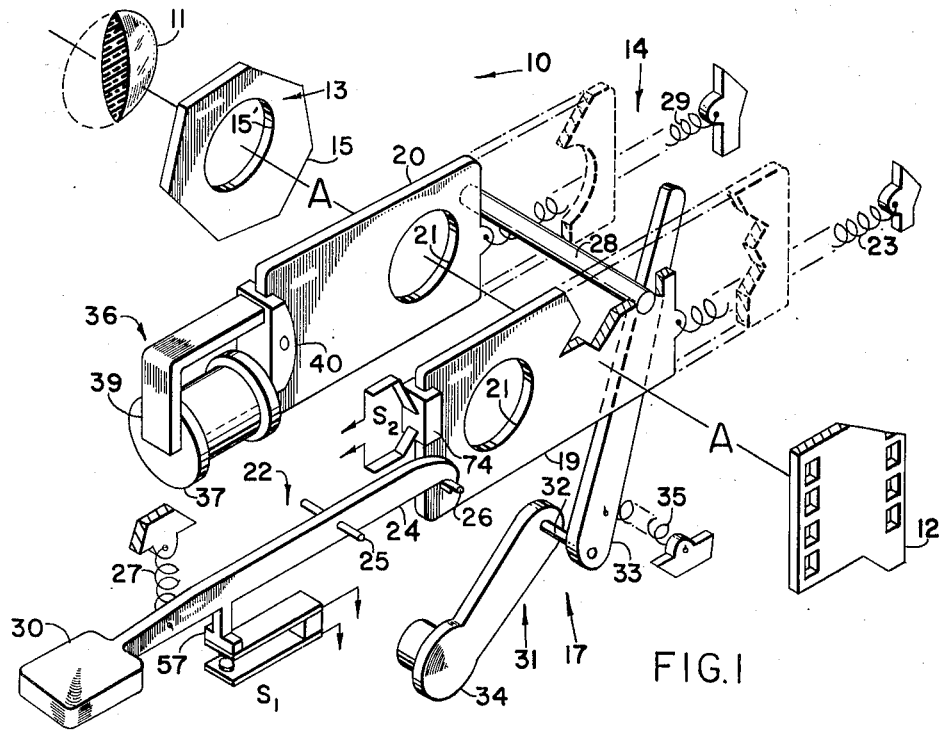
FIGURE 1 is a schematic representation of a camera having shutter means particularly well adapted for use with the present invention.

The shutter control means to be described is shown in the drawing as embodied into a camera having a particular type of shutter, but the latter is for the purpose of illustrating the invention in a simple environment, it being understood that other types of shutters could also be used with the shutter control means disclosed and claimed herein in order to derive the new and improved results attendant thereto.

Referring now to FIGURE 1, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area perpendicular to the optical axis A—A of the camera.

Figure 2:
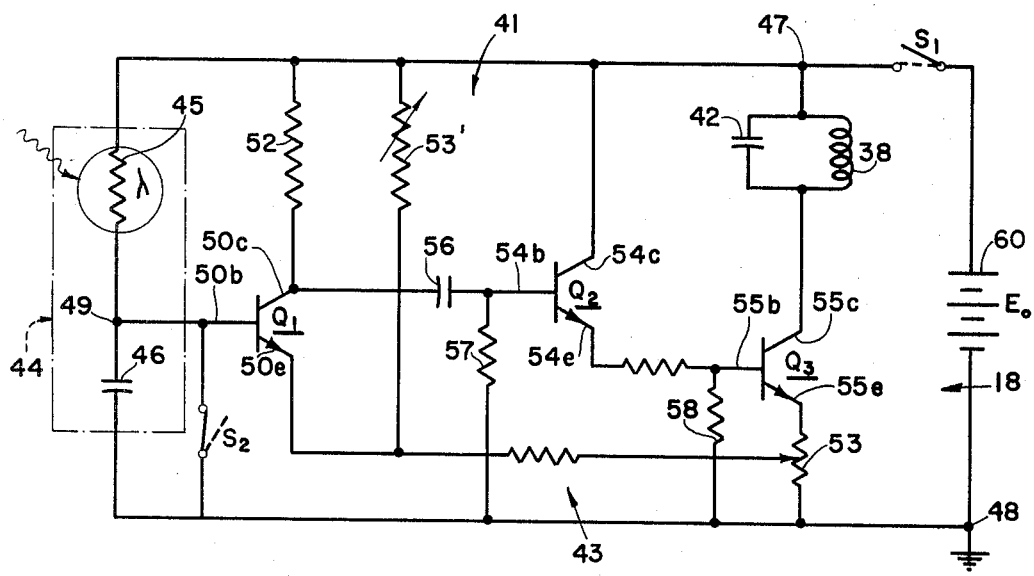
FIG. 2 is a schematic electrical diagram showing one embodiment of the present invention.

Shutter mechanism 14 may include shutter means 17 shown in FIGURE 1, and shutter control means 18 shown in FIG. 2. Shutter means 17 may take the form of a pair of planar, opaque blades 19 and 20, each provided with an exposure orifice 21, and mounted in tracks (not shown) so as to be normal to the optical axis, and reciprocable between terminal positions into intersection with the optical axis. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture area is covered is in the position at which exposure is either initiated or terminated as the case may be. The blade that causes exposure to be initiated is called the "opening" blade. The terminal position at which the opening blade is in the closed position is termed the "blocking" position, while the position intermediate the two terminal positions of the opening blade at which it initiates exposure is termed the "unblocking position." Conversely, the blade that causes exposure to be terminated is called the "closing" blade. The terminal position at which the closing blade is in the open position is termed the "unblocking" position, while the position intermediate the two terminal positions of the closing blade at which it terminates exposure is termed the "blocking" position.

Prior to initiation of exposure, the blades are as shown in the solid lines of FIGURE 1, inspection of which will indicate that releasable coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 remote from the end containing exposure orifice 21, and extends normal thereto into the path of movement of closing blade 20. When the opening blade is held in blocking position by coupling means 22, bar 28 is effective to engage blade 20 and to maintain the latter in the open position against the bias of spring means 29 urging the closing blade toward its blocking position. As can be seen from the drawing, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward open position, and bar 28 is no longer effective to maintain the closing blade 20 in its open position. However, initial movement of opening blade 19, in response to the disengagement of coupling means 22 therefrom, is effective to cause shutter control means 18, in a manner to be described later, to retain closing blade 20 in its open position for a preselected period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preselected period of time, shutter control means 18 causes closing blade 20 to be released thus terminating exposure as the latter is moved from open to blocking position by the action of bias spring means 29.

After exposure is terminated, blades 19 and 20 are in the position shown by the broken lines of FIGURE 1. That is to say, blade 19 is in open position and blade 20 is in its closed position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shutter means to terminate exposure, as previously described. Specifically, operator means 36 may take the form of an electromagnet 37 which has solenoid 38 (see FIG. 2) wound around one leg of U-shaped pole-piece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29 and is sufficient to resist dynamic loads, such as those due to the shock of the bottoming of the opening blade.

As shown in FIG. 2, shutter control means 18 further includes shutter timing apparatus 41, the purpose of which is to furnish an energizing current to the solenoid 38 of electromagnet 37. Where the camera is to be portable and hence battery operated, it is essential to minimize current drain on the battery. With this in mind, premature release of closing blade 20 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid must be energized before opening blade 19 begins to move out of unblocking position, because this blade, through bar 28, serves to initially position keeper 40 in engagement with pole-piece 39. Once the keeper has separated even slightly from the pole-piece, the reluctance of the magnetic circuit is so high, that the solenoid current is unable to produce an attractive force that will overcome the force of spring 29 urging the closing blade to blocking position.

For the reasons set forth above, namely rapid switching of the current input to the solenoid and low power consumption, shutter timing apparatus 41 may take the form of a three-transistor, modified Schmitt-type trigger circuit 43 responsive to the output voltage from timing circuit 44. The latter includes photoconductive element 45, such as a cadmium sulfide photocell or the like exposed to light from the scene being photographed and having a resistance functionally related to the level of scene brightness, and capacitor 46 connected in series between terminals 47 and 48 of the shutter timing apparatus. Circuit 44 constitutes a conventional integrator circuit whose input terminal is at 47 and whose output terminal is at 49, the connection between capacitor 46 and element 45.

Circuit 43 has an input that is a normally not-conducting stage, and includes transistor $Q_1$; and an output that is a normally conducting stage, and includes transistors $Q_2$ and $Q_3$. $Q_1$ has base, collector and emitter electrodes 50b, 50c and 50e respectively with electrode 60c connected through load resistor 52 to terminal 47, electrode 50e connected to terminal 48 through common emitter resistor 53 and electrode 50b connected to connection 49 such that element 45 defines for $Q_1$ a base bias resistor. The base of $Q_1$ is initially grounded through switch S2 and the emitter is coupled to terminal 47 through bias resistor 53′. $Q_2$ has base, collector and emitter electrodes 54b, 54c and 54e respectively, with electrode 54c connected directly to terminal 47 and electrode 54e connected to terminal 48 through load resistor 58. The base of $Q_2$ is A.C. coupled to the collector of $Q_1$ by cut-off capacitor 56 and to terminal 48 through cut-off resistor 57. $Q_2$ is thus an emitter-follower for driving $Q_3$, the latter having base, collector and emitter electrodes 55b, 55c and 55e respectively. The base of $Q_3$ is coupled to $Q_7$ through load resistor 58 while the emitter is coupled to terminal 48 through common emitter resistor 53. The collector of $Q_3$ is coupled to terminal 47 through solenoid 38 which constitutes the load for this transistor. While the stages of circuit 43 have been characterized as "normally not-conducting" and "normally-conducting," it should be obvious that this characterization is applicable only when a voltage source is applied across terminals 47 and 48.

In order to take a picture, an operator depresses end portion 30 of lever 24 (see FIGURE 1). Switch operating arm 59 engages the contacts of switch S1 before the rotation imparted to lever 24 effects its disengagement from pin 26, closing the contacts and applying battery 60, of voltage $E_o$, across terminals 47 and 48. In this way, current drain on the battery is minimized. The battery will be applied across the terminals as long as the operator maintains lever 24 in its depressed state, and since the human reaction time in depressing and releasing portion 30, and the inertial delay of the lever in returning to its normal position substantially exceeds the longest exposure likely to be used under normal "snap-shot" conditions, the contacts of S1 will be closed for at least as long as the correct exposure time.

When S1 is initially closed, S2 is closed and the flow of current through resistors 53′ and 53 establishes a reverse bias condition on the base-emitter junction of $Q_1$ and the latter is cut off. However, at the instant S1 is closed, a voltage appears at the base of $Q_2$ which depends on the resistances 52 and 57. Thus, a transient current begins to flow through the base of $Q_2$. With the proper selection of circuit parameters, the transient current in the base permits emitter current to flow such that $Q_3$ is properly biased for conduction. Thus, when S1 is closed, solenoid 38 is instantaneously energized to provide in the magnetic circuit of pole-piece 39 and keeper 40 a magnetic induction sufficiently large to create a force on the keeper that is greater than the bias due spring 29, and the closing blade is thus in its terminal blocking position independently of the opening blade.

When lever 24 is disengaged from pin 26, the bias on the opening blade is effective to cause the latter to move toward its unblocking terminal position. Initial movement of the opening blade opens S2 which serves to activate timing network 44, which is to say that the latter generates at connection 49 a time variable voltage. If the level of scene brightness is high (say 400 candles/ft.²), the time variation of voltage is suggested by curve 100 in FIG. 3. In such case, the voltage at the base of $Q_1$ forward biases the latter into conduction before the transient current in base of $Q_2$ reaches a point at which $Q_2$ is cut off. The voltage at connection 49 at which $Q_1$ is forward biased is termed the trigger voltage and the time to reach this voltage after activation of the timing network is termed the trigger generation time.

When the trigger voltage is reached, $Q_1$ conducts heavily drawing collector current and rapidly and simultaneously lowering the voltage at electrodes 50c and 54b. This change is reflected at electrode 55b of $Q_3$ by reducing the forward bias on $Q_3$ and reducing current in resistor 53. This causes $Q_1$ to conduct to a greater extent with the result that the regenerative feedback between the stages causes conduction to switch rapidly. Thus, $Q_3$ abruptly ceases conducting and the solenoid is deenergized. Capacitor 42 coupled across the solenoid prevents the voltage induced therein due to the changing current in the solenoid and changing flux in the magnetic field from damaging $Q_3$. The closing blade is thus released for movement to its terminal blocking position.

Referring back now to the disengagement of lever 24 from pin 26, opening blade 19 requires a finite time, termed the opening blade delay, to move from its terminal blocking position to its intermediate position at which exposure is initiated. When the solenoid is deenergized, closing blade 20 requires a finite time, termed the closing blade delay, to move from its terminal unblocking position to its intermediate position at which exposure is terminated. By making two blade delays the same, the trigger generation time is essentially equal to the exposure time even though the two times are not concurrent. And, since the time between the closing of S1 and the initial movement of the opening blade is so small in comparison to the exposure time, it may be said that the exposure time is essentially the time that the shutter operator means is actuated (solenoid is energized). Because the resistance of element 45 is functionally related to the level of scene brightness, the exposure time is also functionally related to the level of scene brightness. With proper design, the amount of light received by the film (time integral of brightness evaluated between the initiation and termination of exposure) will be substantially constant over a wide range of levels of scene brightness. In other words, the amount of light received by the film is substantially independent of the level of scene brightness.

The various circuit parameters can be adjusted to cause $Q_3$ to conduct to the degree necessary to provide the proper induction in the magnetic circuit of pole-piece 39 and keeper 40 for preventing accidental release of the closing blade when the opening blade moves out of its terminal blocking position, and when the opening blade bottoms at its open position, the latter causing considerable shock loading of the keeper. When the level of scene brightness is relatively high, curve 100 in FIG. 3 shows the time variation of the voltage output of the timing circuit. Immediately below the curve is shown the current pulse through the solenoid. When the current is cut off, the force on the closing blade tending to move the same toward its blocking position is the difference between the bias of spring 29 and the decreasing magnetic force due to the rapidly decreasing magnetic induction in the pole-piece and keeper. The net force is effective to accelerate the closing blade from rest so that there is a very short but finite time (about ⅓ ms.) after the current in the solenoid is cut off before the blade actually moves sufficiently to preclude recapture in the event the solenoid were reenergized. This time is termed the blade release time. Its importance will be shown by assuming that $Q_2$ is D.C. coupled to $Q_1$, which is to say that capacitor 56 is short circuited and resistor 57 is omitted. In such case, $Q_2$ has an essentially common emitter configuration with resistor 52 furnishing fixed base current bias. At a relatively high level of scene brightness, the voltage at connection 49 will vary with time generally as is shown by curve 100 in FIG. 3. When the trigger voltage is reached, the resistance of element 45 is so low that the current flowing therethrough is sufficient to permit capacitor 46 to continue charging and still provide sufficient base current so that when the latter is amplified by $Q_1$, sufficient collector current flows to drive $Q_2$ and $Q_3$ to cut-off and hold them cut off. Blade release can occur for obvious reasons.

At some lower level of scene brightness, the resistance of element 45 will be such that the current flowing therethrough, while not sufficient to permit capacitor 46 to continue charging when the trigger voltage is reached, is nevertheless sufficient to provide enough base current to cause $Q_2$ and $Q_3$ to be cut off. This situation is suggested by curve 101, and blade release can occur under these conditions. However, as the levels of scene brightness decrease, the resistance of element 45 increases. A level is reached at which the trigger voltage will cause capacitor 46 to discharge through the base of $Q_1$ so that the base current includes current flowing through element 45 as well as current from the capacitor. While $Q_1$ may have sufficient gain to provide enough collector current to drive $Q_2$ and $Q_3$ to cut-off during the time capacitor 46 is supplying base current, the capacitor quickly discharges (as suggested by curve 102), and $Q_1$ may not have sufficient gain to provide enough collector current to keep $Q_2$ and $Q_3$ cut off when the only base current in $Q_1$ is the current passing through element 45. In such case, $Q_1$ cannot hold $Q_2$ and $Q_3$ cut off for the blade release time. The reenergization of the solenoid that results causes the closing blade to be recaptured so that exposure is not terminated and the closing blade hangs-up in its open position.

To overcome this problem, A.C. coupling between $Q_2$ and $Q_1$ is employed such that base current flows sufficiently to maintain $Q_3$ in its conduction state for a predetermined period of time. With capacitor 56 and resistor 57 present, the voltage at electrode 54b of $Q_3$ varies with time as shown in FIG. 4 where S1 is closed at time zero. At the instant S1 is closed, the circuit of resistors 52 and 57 and capacitor 56 responds as if the capacitor were not present and the voltage at electrode 54b jumps to a value determined by what is essentially a voltage divider network of resistors 52 and 57 in series as previously described. $Q_2$ is properly biased and conducts, the base current being transient in nature and tending to zero as the voltage at the base of $Q_2$ seeks its equilibrium value. As shown in FIG. 4, the voltage decays exponentially with a time constant depending essentially on the sum of the resistances of resistors 52 and 57 and the capacitance of capacitor 56, particularly since the resistance of the base and collector junctions even when $Q_2$ conducts is considerably higher than the fixed resistors 52 and 57. Eventually, the voltage decays to the point where the base current can no longer support conduction of $Q_2$ and conduction ceases thereby driving $Q_3$ to cut-off and deenergizing the solenoid provided the operation of $Q_1$ has not already accomplished this. This situation is suggested by curve 103 in FIG. 4. By suitable choice of resistors 52 and 57 and capacitor 56, the so-called maximum exposure time can be selected as the time at which $Q_1$ begins to fail to exert control over the release of the closing blade. Of course this situation will exist as long as capacitor 46 remains unchanged.

At levels of scene brightness at which $Q_1$ does exert a control over the release of the closing blade, the voltage at the base of $Q_2$ is as suggested by curve 104. Here, the conduction of $Q_1$ drives the voltage at the base of $Q_2$ to a point where the emitter base junction is reverse biased and cut off is effected.

Those skilled in the art can now appreciate that the present invention provides a shutter mechanism of the type described which is effective to secure the release of the closing blade when the main timing circuit fails to cause such release due either to a failure to deenergize the solenoid or a failure to maintain the solenoid in its deenergized state for at least the blade release time.

Since the novelty involved in this invention relates to the provision of an auxiliary timing circuit 56, 57 that automatically terminates exposure independently of both the conventional timing circuit 44 and the manually operable lever 24, it is believed obvious that the invention could be utilized in an environment where a solenoid is deenergized to effect attraction of the closing blade (as where a permanent magnet is employed) and energized to effect release (as where the magnetic field due to energization cancels the field of the permanent magnet). In other words, the environment for the invention requires merely electromechanical means 36 to be associated with closing blade 20 and to be operable by shutter control means 18 to control movement of the blade from its unblocking terminal position to its blocking terminal position. Thus, shutter control means 18, in response to manual actuation of lever 24 to close S1, operates electromechanical means 36 after an interval of time dependent on the level of scene brightness, and release of the closing blade is effected. The invention itself involves additional means to operate, automatically, the electromechanical means after a preselected interval of time that is independent of the level of scene brightness.

FIG. 5 shows another embodiment of the invention. Basically, the circuit shown here differs from the circuit shown in FIG. 2 in three respects: (1) capacitor 46 of the timing circuit is connected, at all times prior to the closing of S1 and initial movement of the closing blade, directly across battery 60; (2) capacitor 42 used to protect transistor $Q_3$ when the latter is switched off, is connected, not across solenoid 38, but between collector electrode 55c of $Q_3$ and terminal 48; and (3) the base of $Q_2$ is D.C. coupled to the collector of $Q_1$ with cut off capacitor 56 inserted in the collector circuit of $Q_1$ and cut off resistor 57 eliminated.

As to capacitor 46, its location in the embodiment of FIG. 5 is such that battery 60 is always applied thereacross during intervals between activation of the timing circuit. This permits an electrolytic capacitor to be used (e.g., an aluminum electrolytic capacitor) since such capacitor under this condition has a shelf life that is comparable to that of a more expensive tantalum capacitor suitable with the circuit shown in FIG. 2, and a capacitance that is substantially as stable with time as the capacitance of a tantalum capacitor. As to capacitor 42, its location as shown in FIG. 5 does not affect its ability to protect $Q_3$ from reverse voltages induced in solenoid 38 when $Q_3$ is switched off, but has the added advantage of not slowing down the rate at which the current in the solenoid builds up where $Q_3$ is switched on or decays when $Q_3$ is switched off.

In operation, the shutter blade movement is as described above. However, in this embodiment capacitor 46 is changed to the battery voltage $E_0$ prior to the closing of S1 and the opening of S2. When S1 is closed, battery 60 is placed across element 45 and S2 is opened immediately thereafter. The latter causes capacitor 46 to discharge through element 45. Since terminal 49 was originally at ground, the voltage there increases exponentially until $Q_1$ is forward biased into conduction. The remaining operation of the circuit is the same as previously described when the level of scene brightness is within the range for normal operation of the circuit. That is, the conduction of $Q_1$ causes $Q_2$ and $Q_3$ to cut off.

When S1 is initially closed, base 54b of $Q_2$ is supplied with transient current due to the presence of cut off capacitor 56 in the collector circuit of $Q_1$. This transient current permits $Q_2$ to conduct for a finite period of time, after which $Q_2$ stops conducting thus cutting off $Q_3$ and effecting release of the closure blade regardless of the condition of $Q_1$. Thus, capacitor 56 and resistor 52 constitutes means effective to deenergize the solenoid after a preselected interval of time that is independent of the level of scene brightness. Furthermore, resistor 57 shown in the embodiment of FIG. 2 has been eliminated and its function performed by resistor 52. This elimination of resistor 57 not only saves a component thus simplifying the circuit, but also simplifies, somewhat, the circuit design with respect to the loading of $Q_1$, the gain of $Q_1$ and the ease with which a given maximum time for energization of the solenoid can be accomplished.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter mechanism for a camera having a housing and an exposure aperture, comprising:
   (a) a shutter blade movable on said housing and having a blocking terminal position and an unblocking terminal position relative to said exposure aperture for controlling the passage of incident light therethrough;
   (b) bias means associated with said shutter blade for urging the same toward its blocking terminal position;
   (c) keeper means on said shutter blade;
   (d) a solenoid operably associated with a pole piece and so mounted on said housing that the engagement of said keeper means with said pole piece defines the unblocking terminal position of said blade and completes therewith a magnetic circuit such that energization of said solenoid is effective to create a magnetic force on said keeper sufficient to maintain said shutter blade in its unblocking terminal position against the action of the bias means associated therewith;
   (e) manually operable means for moving said blade to its unblocking terminal position against the action of said bias means;
   (f) first means releasably engageable with said blade when the latter is in unblocking terminal position for releasably retaining said blade in unblocking terminal position prior to energization of said solenoid;
   (g) an electrical circuit operable to energize said solenoid for a period of time depending upon at least one variable electrical parameter;
   (h) means to operate said electrical circuit and disengage said first means from said blade substantially at the same time whereby said solenoid is effective to maintain said blade in unblocking terminal position until said solenoid is deenergized after which release of said blade is effected and the latter moves to its blocking terminal position under the action of said bias means; and
   (i) means to automatically deenergize said solenoid after a preselected period of time independently of said variable electrical parameter whereby said preselected period of time represents the longest time that said solenoid can be energized.

2. A shutter mechanism in accordance with claim 1 wherein said one variable electrical parameter is functionally related to the level of brightness of a scene being photographed.

3. A shutter mechanism in accordance with claim 1 wherein said electrical circuit includes a photosensitive element exposed to light from said scene and having a resistance which is functionally related to the level of brightness of a scene being photographed, said resistance constituting said variable electrical parameter.

4. A shutter mechanism for a camera having an exposure aperture for photographing a scene, comprising:
   (a) at least one shutter blade selectively movable into blocking and unblocking position relative to said exposure aperture for controlling the passage of incident light therethrough;
   (b) electromagnetic means operably associated with said shutter blade when the latter is in unblocking position such that energization of said electromagnetic means causes the latter to attract said blade and maintain the same in unblocking position;
   (c) means to energize said electromagnetic means;
   (d) means to deenergize said electromagnetic means after an interval of time dependent on the level of scene brightness;
   (e) means effective to move said shutter blade to blocking position after said electromagnetic means is deenergized; and
   (f) means to automatically deenergize said electromagnetic means after a preselected interval of time independent of the level of scene brightness whereby said preselected interval of time represents the longest interval of time that said electromagnetic means can be energized irrespective of the level of scene brightness.

5. A shutter mechanism for a camera having an exposure aperture for photographing a scene comprising:
   (a) at least one shutter blade selectively movable into blocking and unblocking position relative to said exposure aperture for controlling the passage of incident light therethrough;
   (b) electromagnetic means being operably associated with said shutter blade when the latter is in unblocking position such that energization of said electromagnetic means causes the latter to attract said blade and maintain the same in unblocking position;
   (c) first means to energize said electromagnetic means;
   (d) second means conditionally effective to deenergize said electromagnetic means after an interval of time dependent on the level of scene brightness;
   (e) third means to automatically deenergize said electromagnetic means after a preselected interval of time in the event said second means is not effective in deenergizing said electromagnetic means; and
   (f) fourth means effective to move said shutter blade to blocking position after said electromagnetic means is deenergized.

6. A shutter mechanism for a camera having a housing and an exposure aperture, comprising:
   (a) an opening shutter blade and a closing shutter blade each movable on said housing and having a blocking terminal position and an unblocking terminal position relative to said aperture for controlling the passage of incident light therethrough;
   (b) bias means associated with each of said blades for urging said opening blade toward its unblocking terminal position and said closing blade toward its blocking terminal position;
   (c) manually operable means for moving said opening blade to its blocking terminal position;
   (d) means on said opening blade engageable with said closing blade to move the latter to its unblocking terminal position when said opening blade is moved to its blocking terminal position;
   (e) keeper means on said closing blade;
   (f) a solenoid operably associated with a pole piece and so mounted on said housing that said keeper means engages said pole piece and completes therewith a magnetic circuit when said closing blade is in its unblocking terminal position whereby energization of said solenoid creates a magnetic force on said keeper that is sufficient to maintain said closing blade in its unblocking terminal position against the action of the bias means associated therewith;
   (g) first means releasably engageable with said opening blade when the latter is in its blocking terminal position for releasably retaining prior to energization of said solenoid said opening blade in its blocking terminal position whereby said closing blade is retained in its unblocking terminal position;
   (h) an electrical circuit operable to energize said solenoid for a period of time depending upon at least one variable electrical parameter;
   (i) means to operate said electrical circuit and disengage said first means from said opening blade substantially at the same time whereby said solenoid is effective to maintain said closing blade in unblocking terminal position until said solenoid is deenergized after which release of said closing blade is effected and the latter moves to its terminal position under the action of the bias means associated therewith; and (j) means to automatically deenergize said solenoid after a preselected period of time independently of said variable electrical parameter whereby said preselected period of time represents the longest time that said solenoid can be energized.

7. A shutter mechanism in accordance with claim 6 wherein said one variable electrical parameter is functionally related to the level of brightness of a scene being photographed.

8. A shutter mechanism in accordance with claim 6 wherein said electrical circuit includes a photosensitive element exposed to light from said scene and having a resistance which is functionally related to the level of brightness of a scene being photographed, said resistance constituting said variable electrical parameter.

9. A shutter mechanism for a camera having a housing and an exposure aperture, comprising:

(a) a shutter blade movable on said housing and having a blocking terminal position and an unblocking terminal position relative to said exposure aperture for controlling the passage of incident light therethrough;

(b) bias means associated with said shutter blade for urging the same toward its blocking terminal position;

(c) keeper means on said shutter blade;

(d) a solenoid operably associated with a pole piece and so mounted on said housing that the engagement of said keeper means with said pole piece defines the unblocking terminal position of said blade and completes therewith a magnetic circuit such that energization of said solenoid is effective to create a magnetic force on said keeper sufficient to maintain said shutter blade in its unblocking terminal position against the action of the bias means associated therewith;

(e) manually operable means for moving said blade to its unblocking terminal position against the action of said bias means;

(f) first means releasably engageable with said blade when the latter is in unblocking terminal position for releasably retaining said blade in unblocking terminal position prior to energization of said solenoid;

(g) a voltage sensitive trigger circuit for energizing and deenergizing said solenoid;

(h) means to substantially simultaneously cause said trigger circuit to energize said solenoid and disengage said first means from said blade whereby said solenoid is effective to maintain said blade in unblocking position;

(i) a timing circuit, which when activated, generates a time variable voltage that reaches a level termed the trigger voltage in a period of time, termed the trigger generation time, that is dependent upon a variable electrical parameter;

(j) means for activating said timing circuit substantially at the same time said first means is disengaged from said blade;

(k) said voltage sensitive trigger circuit being conditionally responsive to the time variable voltage generated by said timing circuit for deenergizing said solenoid when the last-mentioned voltage reaches said trigger voltage; and (l) means to deenergize said solenoid after a preselected period of time subsequent to activation in the event said voltage sensitive trigger circuit fails to deenergize said solenoid.

10. A shutter mechanism in accordance with claim 9 wherein said timing circuit includes means responsive to the level of brightness of a scene being photographed for controlling said period of time whereby a physical attribute of the last-named means constitutes said parameter.

11. A shutter mechanism in accordance with claim 9 wherein said timing circuit includes means responsive to the level of scene brightness over a range thereof for regulating said period of time such that the amount of light incident on said exposure aperture during said period of time is substantially constant and independent of the level of scene brightness over said range whereby a physical attribute of the last-named means constitutes said parameter.

12. A shutter mechanism for a camera having a housing and an exposure aperture, comprising:

(a) a shutter blade movable on said housing and having a blocking terminal position and an unblocking terminal position relative to said exposure aperture for controlling the passage of incident light therethrough;

(b) bias means associated with said shutter blade for urging the same toward its blocking terminal position;

(c) keeper means on said shutter blade;

(d) a solenoid operably associated with a pole piece and so mounted on said housing that the engagement of said keeper means with said pole piece defines the unblocking terminal position of said blade and completes therewith a magnetic circuit such that energization of said solenoid is effective to create a magnetic force on said keeper sufficient to maintain said shutter blade in its unblocking terminal position against the action of the bias means associated therewith;

(e) manually operable means for moving said blade to its unblocking terminal position against the action of said bias means;

(f) first means releasably engageable with said blade when the latter is in unblocking terminal position for releasably retaining said blade in unblocking terminal position prior to energization of said solenoid;

(g) a voltage sensitive trigger circuit having at least two stages, one stage of which is coupled to said solenoid so that the latter is energized and deenergized when said one stage respectively conducts and stops conducting;

(h) means to substantially simultaneously cause said one stage to conduct and energize said solenoid and disengage said first means from said blade whereby said solenoid is effective to maintain said blade in unblocking position;

(i) a timing circuit, which when activated, generates a time variable voltage that reaches a level termed the trigger voltage in a period of time, termed the trigger generation time, that is dependent upon a variable electrical parameter;

(j) means for activating said timing circuit substantially at the same time said first means is disengaged from said blade;

(k) said voltage sensitive trigger circuit having another stage coupled to said one stage so that conduction of the latter is effected when the other stage is cut off and conduction of said one stage stops when the other stage conducts;

(l) said other stage being responsive to the voltage generated by said timing circuit so that the latter maintains said other stage cut off during the trigger generation time and causes said other stage to conduct when the voltage generated by said timing circuit reaches the trigger voltage; and (m) means, independent of said timing circuit and said other stage, for effecting conduction of said one stage only during a preselected period of time subsequent to activation of said timing circuit.

13. A shutter mechanism in accordance with claim 12 wherein said last-named means includes the coupling between said one stage and said other stage of said voltage sensitive trigger circuit.

14. A shutter mechanism in accordance with claim 13 wherein said one stage is A.C. coupled to said other stage.

15. A shutter mechanism for a camera having an exposure aperture for photographing a scene, comprising:
(a) at least one shutter blade selectively movable into blocking and unblocking position relative to said exposure aperture for controlling the passage of incident light therethrough;
(b) electromechanical means associated with said shutter blade and operable to control movement of said blade from its unblocking position to its blocking position;
(c) first means to operate said electromechanical means after an interval of time dependent on the level of scene brightness; and
(d) second means automatically to operate said electromechanical means after a preselected interval of time that is independent of the level of scene brightness.

16. A shutter mechanism for a camera having an exposure aperture for photographing a scene, comprising:
(a) at least one shutter blade selectively movable into blocking and unblocking position relative to said exposure aperture for controlling the passage of incident light therethrough;
(b) electromechanical means associated with said shutter blade and operable to control movement of said blade from its unblocking position to its blocking position;
(c) first means to operate said electromechanical means after an interval of time dependent on the level of scene brightness; and
(d) second means to automatically operate said electromechanical means after a preselected interval of time independent of the level of scene brightness.

17. A shutter mechanism for a camera having an exposure aperture for photographing a scene, comprising:
(a) at least one shutter blade selectively movable into blocking and unblocking position relatively to said exposure aperture for controlling the passage of incident light therethrough;
(b) electromechanical means associated with said shutter blade when the latter is in unblocking position such that actuation of said electromechanical means causes the latter to maintain said blade in unblocking position and deactuation of said electromechanical means effects movement of said blade to blocking position;
(c) first means responsive to the level of brightness of a scene being photographed for deactuating said electromechanical means after an interval of time functionally related to the level of scene brightness; and
(d) second means to automatically deactuate said electromechanical means after a preselected interval of time independent of the level of scene brightness.

18. A shutter mechanism for a camera having an exposure aperture for photographing a scene, comprising:
(a) at least one shutter blade selectively movable into blocking and unblocking position relative to said exposure aperture for controlling the passage of incident light therethrough;
(b) electromechanical means associated with said shutter blade when the latter is in unblocking position such that actuation of said electromechanical means causes the latter to maintain said blade in unblocking position and deactuation of said electromechanical means effects movement of said blade to blocking position;
(c) an electrical circuit operable to actuate said electromechanical means;
(d) means for operating said electrical circuit whereby said electromechanical means is actuated;
(e) first means for causing said electrical circuit to deactuate said electromechanical means after a period of time functionally dependent upon at least one electrical parameter; and
(f) second means to automatically deactuate said electromechanical means after a preselected interval of time independent of said electrical parameter.

19. A shutter mechanism for a camera having an exposure aperture for photographing a scene, comprising:
(a) at least one shutter blade selectively movable into blocking and unblocking position relative to said exposure aperture for controlling the passage of incident light therethrough;
(b) electromechanical means associated with said shutter blade when the latter is in unblocking position such that actuation of said electromechanical means causes the latter to maintain said blade in unblocking position and deactuation of said electromechanical means effects movement of said blade to blocking position;
(c) an electrical circuit operable to actuate said electromechanical means;
(d) manual means for operating said electrical circuit whereby said electromechanical means is actuated;
(e) first means for causing said electrical circuit to deactuate said electromechanical means after a period of time functionally dependent upon at least one electrical parameter; and
(f) second means to automatically deactuate said electromechanical means after a preselected interval of time that is independent of both said manual means and said first means.

20. A shutter mechanism for a camera comprising:
(a) shutter means operable to control the exposure interval of said camera;
(b) a timing circuit including an element having a variable electrical characteristic, said circuit producing an output in response to initiation of exposure which changes with time in a manner functionally dependent upon said variable electrical characteristic;
(c) shutter operator means responsive to the output of said timing circuit for operating said shutter means to effect exposure while said output has a level less than a preselected trigger level and to terminate exposure when said output reaches said trigger level; and
(d) auxiliary timing means automatically responsive to initiation of exposure for causing said shutter operator means to terminate exposure within a predetermined time interval following the initiation of exposure unless exposure is previously terminated in response to the output of said timing circuit.

21. Apparatus in accordance with claim 20 wherein said element of said timing circuit is a light-dependent resistor whose value is functionally related to the brightness of the scene being photographed and constitutes said variable electrical characteristic.

22. Apparatus in accordance with 21 wherein said timing circuit includes a capacitor, the current through which changes exponentially in response to initiation of exposure with a time constant dependent on at least the resistance of said light dependent resistor.

References Cited by the Examiner
UNITED STATES PATENTS

| | | | |
|---|---|---|---|
| 2,179,717 | 11/1939 | Fedotoff | 95—60 |
| 3,095,790 | 7/1963 | Gebele | 95—10 |

JOHN M. HORAN, *Primary Examiner.*

NORTON ANSHER, *Examiner.*